Patented Jan. 30, 1951

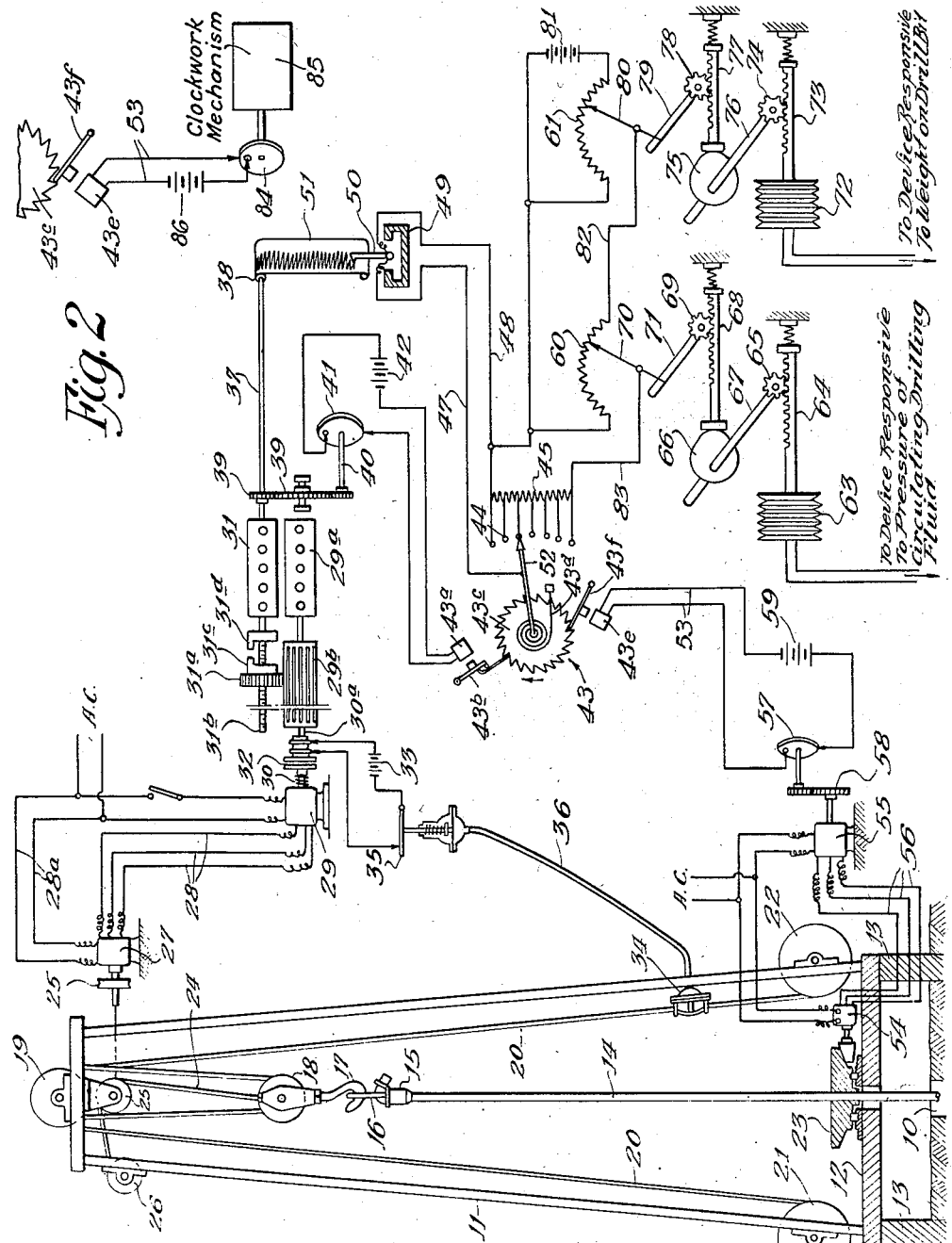

2,539,758

UNITED STATES PATENT OFFICE 2,539,758

MEANS FOR LOGGING DRILLING RATES

Daniel Silverman and Robert W. Stuart, Tulsa, Okla., assignors to Stanolind Oil and Gas Company, Tulsa, Okla., a corporation of Delaware Application December 26, 1945, Serial No. 637,191

18 Claims. (Cl. 346—39)

This invention relates to the art of logging wells during the drilling thereof and more particularly to a method and apparatus for logging wells which are drilled by the rotary drilling method involving the measurement of the rate at which the drill bit penetrates the various strata encountered so that an accurate log of the geological formations can be obtained.

This application is a continuation-in-part of application Serial Number 516,116, filed December 29, 1943, now forfeited.

For many years well drillers operating rotary rigs have been able to determine to a limited extent by the behavior of the rotating mechanism when there has been a change in the nature and characteristics of the formation being drilled. Some efforts have been made to systematize and obtain permanent records of this sort of information. For example, spaced marks have been made on the Kelly joint, and the time required to drill the distance between such marks noted. Furthermore, the same principle has been applied to an automatic recording system in which a mark is made on a moving chart for each foot or other selected increment of hole drilled, so that a measure of the drilling rate is obtained. In another system, the position of the Kelly joint or traveling block is recorded on a chart moving at a constant speed, thus providing data for the calculation of the drilling rate.

The systems mentioned above and other similar systems have a common failing in that, while they may correctly represent the rate of progress of the bit as a function of depth, the resultant record is not a true log of the formation traversed since it has failed to take into account certain important variables in the drilling process. For example, the desired type of record is not obtained because calculation is necessary before it is readily understandable, and prior methods in which a readily understood record is obtained do not automatically compensate for possible errors which might give misleading information.

A system for obtaining a log of a well during the drilling operation which satisfied some of the requirements enumerated above is described in our United States application Serial No. 347,569, filed July 25, 1940, now Patent No. 2,365,014. According to that system a log of the relative rates of drilling through the various strata traversed by the drill bit is obtained. A preferred form of that system is one in which the drilling rate is recorded in terms of revolutions of the drill bit rather than in terms of time. Such a system is best suited to drilling operations where the speed of rotation of the drill bit varies. However, when the speed of rotation is substantially constant, a record of the drilling rate in terms of time gives as reliable a record as the record based on revolutions of the drill bit.

According to the present invention, a more accurate log of the formations may be obtained. The drilling rate is affected not only by the speed of rotation of the drill bit but also by other conditions, the most important of which are the weight on the drill bit and to a lesser extent the pressure on the circulating drilling fluid. It is obvious that the drill bit will cut more rapidly as the weight thereon is increased until such time as the drill bit may become lodged in the formation so that rotation thereof is prevented. Also it is known that the drilling rate is affected by the pressure on the circulating drilling fluid, a faster circulation of said fluid improving the cutting ability of the drill bit by rapidly removing cuttings from the bottom of the bore hole and, at times, removing solid formation by hydraulic sluicing.

It is therefore an object of our invention to provide an improved method and apparatus for obtaining a log of the drilling rate in which corrections are made for variations in operating characteristics such as weight on the drill bit, drill mud pressure, etc. For the purposes of this description the term "drilling rate" will be used to designate the distance drilled per unit of time and also the distance drilled per unit number of revolutions of the drill bit. Another object is to provide completely automatic apparatus for making such a log in a form immediately understandable and usable. Still another object is to provide apparatus for recording a log of the drilling rate in such manner that the log will give a positive indication of the relative natures and characteristics of the geological formations through which the drill bit passes. A further object is to provide apparatus for making a log of the drilling rate plotted directly against depth in which the drilling rate has been corrected for variations in the weight on the drill bit and/or the pressure on the circulating drilling fluid. Other objects, advantages and uses of the present invention will be apparent from the following detailed description when read in conjunction with the drawings forming a part of this specification.

Figure 1 illustrates one form of apparatus according to the present invention whereby the desired log may be obtained, and Figure 2 illustrates another form of apparatus for obtaining the desired log.

Referring now to Figure 1, the upper portion of a well 10 is shown which is being drilled by the rotary method. The rotary drilling apparatus is conventional and is shown in a very simplified form. This apparatus includes a derrick structure 11 having a floor 12 mounted on foundation members 13. A string of drill pipe having a drill bit (not shown) at its lower end and Kelly joint 14 and mud swivel 15 at its upper end is supported from the upper portion of derrick 11 by means of bail 16, hook 17, traveling block 18, crown block 19 and cable 20. One end of cable 20 is wound upon draw works drum 21 and as shown, the other end, known as the dead line, is wound upon drum 22, although it can be merely anchored to some portion of the derrick structure if desired. Mounted upon derrick floor 12 is a rotary table 23 for the purpose of rotating Kelly joint 14 and hence the entire drill string.

It is deemed unnecessary to describe the operation of drilling, addition of new stands of drill pipe, etc., since all of these operations are well known to those skilled in the art. As mentioned above, however, the drilling rate in the formation being drilled bears a significant relationship to the nature of that formation. In order to measure this drilling rate it is therefore essential to provide some means of following the downward movement of the drill string. There are a large number of methods available for accomplishing this but a preferred method is shown by way of example in Figure 1. A wire line 24 is attached at its lower end to traveling block 18 and passes over a pulley 25 located substantially directly above traveling block 18 and thence to drum 26 upon which it is wound and which is provided with a spring having a strength sufficient to keep line 24 in slight tension regardless of the position of traveling block 18. Obviously both drum 26 and pulley 25 rotate in a manner dependent upon the vertical movement of traveling block 18 and hence of the entire drill string. We have chosen in this instance to utilize pulley 25 as the means for providing depth indications and for this purpose a Selsyn transmitter 27 is illustrated connected to pulley 25. Any rotation of pulley 25 is therefore transmitted by means of transmitter 27 and conductors 28 and 28a to the corresponding Selsyn receiver 29, which is preferably located a short distance away from the drilling rig, and which is utilized to drive the rest of the logging apparatus according to our invention.

It is apparent that Selsyn receiver 29 will rotate at a speed and in a direction corresponding to the raising and lowering of the traveling block 18. As is well known, however, block 18 in the normal course of drilling undergoes many movements in addition to those due to the raising or lowering or general downward progress of the bit; and it is therefore necessary to discriminate against certain of these movements. As shown, the means for accomplishing this takes the form of a magnetic clutch 32 which is engaged only when current from battery 33 passes through its coil. By controlling the closing of switch 35 in series with battery 33 from a weight indicator unit 34 through hydraulic connection 36, such that switch 35 is closed when the drill string is supported by block 18 and open when only kelly 14, for example, is being raised or lowered, only those movements of receiver 29 will actually significant of the position of the bit will be imparted to an algebraic counter 29a. As the counter 29a is simply a revolution counter on which the reading increases with lowering of the drill pipe and decreases when the pipe is raised, its reading will at all times indicate the exact depth of the bit.

The magnetic clutch 32 can suitably be composed of an electromagnet mounted on the shaft 30a, the terminals of the coil of said electromagnet being brought out to slip rings which are engaged by brushes in circuit with battery 33. A flat ferromagnetic plate is mounted on the shaft 30 of receiver 29 in such a manner that it will rotate with the shaft but may be moved longitudinally with respect thereto; this last may be accomplished, for example, by slotting the shaft and mounting the plate loosely on the shaft with a pin going through the slot. It will be seen that when current is applied to the coil of the electromagnet, this late will be drawn firmly against the face of the electromagnet, and the two parts of clutch 32 will then turn as a unit.

Interposed between shaft 30a and counter 29a is an elongated gear 29b which engages a gear-toothed nut 31a on threaded shaft 31b of a second counter 31. Nut 31a carries a projecting pin 31c which, when nut 31a moves to the right, engages a corresponding pin 31d on shaft 31b. It will be seen that as long as nut 31a is driven toward the right with pins 31c and 31d in engagement, the counter 31 will be operated to increase its reading. However, as soon as nut 31a is moved in the opposite direction, as when the bit is lifted off bottom, shaft 31b remains stationary and nut 31a travels to the left at all times engaging gear 29b. Thus as long as pins 31c and 31d remain apart, or in other words, as long as the bit is off the bottom, counter 31 does not record; but when the bit returns to bottom, and drilling is resumed, the pins reengage and operate counter 31. It will be apparent that the reading of counter 31 thus corresponds at all times with the maximum depth to which the bit has penetrated, while algebraic counter 29a indicates the position of the bit at any time whether on or off bottom. It is, of course, not necessary that counters 29a and 31 be of an indicating type, but only that counter 31 have the maximum revolution counting feature described.

Counter 31 is equipped with an output shaft 37 which serves two purposes. First, it actuates recorder reel 38 so that the recording medium 51 actuated thereby registers the depth of the well at a given time. Second, by means of gears 39 and shaft 40 an electrical contacting device 41 is caused to close the circuit including battery 42 and multiple stepping switch 43 momentarily with a frequency proportional to the rate of drill bit penetration. Switch 43 is preferably of the rotary telephone type having a large number of contacts 44, for example twenty-five or fifty such contacts. These contacts 44 are connected to successive points along a resistance 45. It will be apparent that the resistance 45 forms a voltage divider whereby the voltage applied through the leads 47 and 48 to recorder 49 varies in accordance with the particular contact along the resistance 45 on which switch arm 52 bears. Therefore the amount of current flowing through leads 47 and 48 to recorder 49 depends solely upon the position of the arm 52 of multiple stepping switch 43. Recorder 49 is provided with a pen arm 50 arranged in such a way that the electrical variations impressed upon it are recorded upon recording medium 51, as the latter is moved by reel 38.

The operation of multiple stepping switch 43 is such that each time an electrical contact is made by contactor 41, switch arm 52 is moved from one of the contactors 44 to the next in a clockwise direction. This is accomplished because current flows through the upper solenoid 43a of switch 43, thereby attracting the arm 43b of the step by step feed mechanism which moves the center ratchet wheel 43c one notch in a clockwise direction for each actuation of the solenoid 43a, against the action of spiral spring 43d attached to the ratchet wheel 43c. When the lower solenoid 43e of switch 43 is energized by passing an electric current through conductors 53, the flexible release lever 43f associated with solenoid 43e is pulled downward, thus releasing the ratchet wheel 43c permitting it to rotate under the influence of the spiral spring 43d in a counter-clockwise direction to its original position. Obviously, therefore, if arm 52 is returned to its initial position at regular intervals, the maximum travel of switch arm 52 and hence the maximum deflection of pen arm 50 in each cycle will represent the distance drilled per unit of time and recording medium 51 will show a plot in which the drilling rate per unit of time is plotted against the depth of the well. A mechanism for recording the drilling rate per unit of time will be described hereinafter with reference to Figure 2. By suitably regulating the number of contacts made by contactor 41 per foot drilled, this record can be made to have all the usefulness of a smooth curve, although it is the maxima of the successive deflections which are significant.

When the speed of the rotation of the drill bit is known to vary or when it is not known whether the speed is constant or not, it is preferred to obtain an indication of the distance drilled per revolution or unit number of revolutions of the rotary table rather than per unit of time, and apparatus for accomplishing this is shown in Figure 1. A second Selsyn transmitter 54 is arranged to rotate at a speed proportional to that of rotary table 23 and is connected to Selsyn receiver 55 by means of conductors 56, the latter in turn driving a rotary contactor 57 through gears 58. Contactor 57 is connected in series with battery 59 and conductors 53 so that each time the circuit is closed by contactor 57, switch arm 52 will return to its zero position and the number of contacts 44 traversed by switch arm 52 between each of the electric impulses applied through leads 53 is a measure of the distance drilled per revolution of the rotary table, and it is this quantity which it is desired to record on recording medium 51.

The extent of the deflection of pen arm 50 depends upon the value of the current passing through leads 47 and 48. The value of the current is varied primarily by means of resistance 45 in switch 43 although minor variations in the current may be caused by potentiometers 60 and 61. The potentiometers 60 and 61 are actuated when there are variations in the pressure on the circulating drilling fluid and/or variations in the weight on the drill bit. A bellows 63 or other type of pressure-responsive device is actuated by a device which is influenced by the pressure on the circulating drilling fluid. Such devices are well known to those skilled in the art and a Martin-Decker mud pressure instrument of the type described in "Petroleum Production Engineering" by Uren (1934), page 220, may be used. The bellows 63 actuates a rack 64 which in turn drives a pinion 65. A cam 66 is mounted on shaft 67 which is rotated by pinion 65. The cam 66 operates a second rack 68 which drives a second pinion 69. The arm 70 of potentiometer 60 is mounted on shaft 71 which is rotated by pinion 69. The shape of the cam 66 must be determined in accordance with the several variables in the system so that the desired variations in the amount of current due to the movement of arm 70 of potentiometer 60 will be directly proportional to the variations in the drilling rate caused by the variations in the pressure on the circulating drilling fluid. Those variables which must be taken into consideration include the size and shape of jets in the drill bit and type of drill mud as well as the normal or desired amount of pressure on the drill mud.

One way of determining the desired shape of cam 66 is to carry out an experimental drilling operation at the surface using the same type of bit and drilling fluid which will be used in the actual drilling operation. The pressure on the circulating drilling fluid can be varied by known amounts while all other factors except the drilling rate are kept constant. Variations in the drilling rate caused by the known variations in the pressure of the circulating drilling fluid can be accurately and directly determined, and from this data the amount of variation in the current across potentiometer 60, proportional to the variation in the drilling rate can be determined. Knowing the extent of the variations in the current which it is desired to have, a cam can be made having a shape which will directly convert variations of the pressure of the circulating drilling fluid into values corresponding to the variations in the drilling rate caused thereby.

Potentiometer 61 which produces variations in the current due to variations in the weight on the drill bit is operated in a manner similar to the operation of potentiometer 60. A bellows 72 or other pressure-responsive instrument is actuated by any of the well known devices which are responsive to the weight on the drill bit, such as, for instance, a device similar to weight indicator 34 and hydraulic connection 36. If desired, weight indicator 34 may be used for operating both bellows 72 and switch 35. The bellows 72 actuates a rack 73 which drives a pinion 74. A cam 75 is mounted on a shaft 76 which is rotated by pinion 74. The cam 75 actuates a second rack 77 which in turn drives pinion 78 and shaft 79. The arm 80 of potentiometer 61 is mounted on shaft 79. As in the case of cam 66, cam 75 must be shaped in accordance with the variables of the drilling operation so that the variations in the current in leads 4 and 48 caused by movement of arm 80 of potentiometer 61 will be properly proportional to the variations in the drilling rate caused by variations in the weight on the drill bit. These variables include the size and shape as well as the type of drill bit and the normal or desired amount of pressure on the drill bit.

The shape of the cam 75 may be determined in a manner similar to that for cam 66 by carrying out an experimental drilling operation at the surface and directly measuring variations in the drilling rate caused by known changes of weight on the drill bit only.

The circuit for operating recorder 49 includes a battery 81, potentiometers 60 and 61 and resistance 45. The current flowing from battery 81 passes first through the resistance of potentiometer 61 so that a portion thereof will pass through line 82. Variations in the amount of current passing through line 82 are directly proportional to variations in the drilling rate caused by variations in the weight on the drill bit. The current in line 82 then flows through the resistance of potentiometer 60 so that a portion of said current will pass through line 83. Variations in the amount of current in line 83 compared with that in line 82 are directly proportional to variations in the drilling rate caused by variations in the pressure on the circulating drilling fluid. The current in line 83 then passes through switch 43 so that the amount of current which eventually passes through lead 47 to recorder 49 will be proportional to the distance traveled by the drill bit per unit number of revolutions of the drill bit after having been corrected for variations in the weight on the drill bit and for variations in the pressure of the circulating drilling fluid. The log obtained by the present system gives information which can be readily utilized for determining the relative characteristics of the formations which are penetrated by the drill bit so that one can determine with unusual accuracy the exact type of formations being drilled, i. e. whether sand, shale, sandstone, limestone, gypsum or anhydride have been encountered.

Figure 2 illustrates a modified form of the apparatus which may be used when the speed of rotation of the drill bit is substantially constant or at most varies between fairly narrow limits. In this case the drilling rate is recorded as the penetration of the drill bit in terms of time. The leads 53 from solenoid 43e are connected to a commutator 84 driven by a clock work mechanism 85 or other timing device. Every five minutes, or ten minutes or other unit of time the circuit through leads 53, battery 86 and commutator 84 will be closed, thus causing solenoid 43e to be energized. Lever 43f will be activated resetting switch arm 52.

It will be understood that our invention may be used advantageously for correcting the drilling rate for one or the other or both of the above described variable factors, namely the weight on the drill bit or the pressure of the circulating drilling fluid, although the former is usually more important than the latter. Also it is conceivable that variable factors, other than those mentioned, may be compensated for by system without departing from the present invention. For instance, variations in the viscosity of the drilling fluid may influence the drilling rate to a significant degree.

Although our invention has been described with reference to several specific mechanisms, devices and the like, it will be understood that numerous alternative arrangements will be apparent to those skilled in the art and it is intended that such modifications shall come within the scope of the present invention.

Having now described our invention what we claim is:

1. A system for logging a well during a rotary drilling operation wherein variable operating characteristics affecting drilling rate include the weight of the drill bit and the pressure on the circulating drilling fluid comprising means for producing a signal which normally would be proportional to the actual drilling rate and means responsive to variations in at least one variable operating characteristic which affects the drilling rate for modifying said signal by an amount proportional to variations in the drilling rate caused by the variations in said at least one variable operating characteristic to produce a signal proportional to the drilling rate under uniform conditions.

2. A system for logging a well during a rotary drilling operation wherein variable operating characteristics affecting drilling rate include the weight of the drill bit and the pressure on the circulating drilling fluid comprising means for producing a signal which normally would be proportional to the actual drilling rate, means responsive to variations in at least one variable operating characteristic which affects the drilling rate for modifying said signal by an amount proportional to variations in the drilling rate caused by variations in said at least one variable operating characteristic to produce a signal proportional to the drilling rate under uniform conditions and means for exhibiting an indication of said modified signal.

3. A system for logging a well during a rotary drilling operation wherein variable operating characteristics affecting drilling rate include the weight of the drill bit and the pressure on the circulating drilling fluid comprising means for producing an electric signal which normally would be proportional to the actual drilling time rate, means responsive to variations in at least one variable operating characteristic which affects the drilling rate for modifying said electric signal by an amount proportional to variations in the drilling rate caused by variations in said at least one variable operating characteristic to produce an electric signal proportional to the drilling rate under uniform conditions and means for exhibiting an indication of said modified electric signal.

4. A system for logging a well during a rotary drilling operation comprising means for producing a signal which normally would be proportional to the actual drilling time rate and means responsive to variations in the weight on the drill bit for modifying said signal by an amount proportional to variations in the drilling rate caused by said variations in the weight on the drill bit.

5. A system for logging a well during a rotary drilling operation with a drilling fluid comprising means for producing a signal which normally would be proportional to the actual drilling time rate and means responsive to variations in the pressure of the drilling fluid for modifying said signal by an amount proportional to variations in said drilling rate caused by variations in the pressure of the drilling fluid.

6. A system for logging a well during a rotary drilling operation comprising means for producing an electric signal which normally would be directly proportional to the actual drilling time rate, means responsive to variations in the weight on the drill bit for converting said variations into variations in the drilling rate caused by said variations in the weight on the drill bit and means responsive to pressure of circulating drilling fluid for modifying the electric signal by an amount proportional to said variations in the drilling rate.

7. A system for logging a well during a rotary drilling operation comprising a first means for producing a signal which normally would be proportional to the actual drilling time rate, a second means responsive to variations in the weight on the drill bit, a third means actuated by said second means for determining variations in the drilling rate caused by variations in the weight on the drill bit, a fourth means for modifying the signal produced by said first means in accordance with the variations in the drilling rate determined by said third means, and a fifth means for exhibiting an indication of said modified signal.

8. A system for logging a well during a rotary drilling operation wherein variable operating characteristics affecting drilling rate include the weight of the drill bit and the pressure on the circulating drilling fluid comprising means for producing a signal which normally would be proportional to the actual distance drilled per unit number of revolutions of the drill bit and means responsive to variations in at least one variable operating characteristic which affects the distance drilled by the drill bit for modifying said signal by an amount proportional to variations in the distance drilled caused by the variations in said at least one variable operating characteristic to produce a signal proportional to the distance drilled per unit number of revolutions of the drill bit under uniform conditions.

9. A system for logging a well during a rotary drilling operation wherein variable operating characteristics affecting distance drilled per unit of time include the weight of the drill bit and the pressure on the circulating drilling fluid comprising means for producing a signal which normally would be proportional to the actual distance drilled per unit of time and means responsive to variations in at least one variable operating characteristic which affects the distance drilled by the drill bit for modifying said signal by an amount proportional to variations in the distance drilled caused by the variations in said at least one variable operating characteristic to produce a signal proportional to the distance drilled per unit of time under uniform conditions.

10. Apparatus for logging a well during a rotary drilling operation wherein variable operating characteristics affecting drilling rate include the weight of the drill bit and the pressure on the circulating drilling fluid comprising means for recording an electric signal on a recording medium, means associated with the drill string supporting mechanism for moving said recording medium in a manner proportional to the movement of said drill string supporting mechanism, means actuated by said last-mentioned means and actuating said recording means for producing an electric signal which normally would be proportional to the drilling rate, means for determining variations in the drilling rate which are caused by variations of at least one operating characteristic and means for modifying the electric signal by an amount proportional to said variations in the drilling rate to produce a signal proportional to the drilling rate under uniform conditions.

11. A system for logging a well during a rotary drilling operation wherein variable operating characteristics affecting drilling rate include the weight of the drill bit and the pressure on the circulating drilling fluid comprising means for producing a signal which normally would be proportional to the actual distance drilled per unit number of revolutions of the drill bit, and means responsive to variations in at least one variable operating characteristic which affects the distance drilled by the drill bit for modifying said signal by an amount proportional to variations in the distance drilled caused by the variations in said at least one variable operating characteristic to produce a signal proportional to the distance drilled per unit number of revolutions of the drill bit under uniform conditions.

12. A system for logging a well during a rotary drilling operation wherein variable operating characteristics affecting drilling rate include the weight of the drill bit and the pressure on the circulating drilling fluid comprising means for producing a signal which normally would be proportional to the actual distance drilled per unit number of revolutions of the drill bit, means responsive to variations in at least one variable operating characteristic which affects the distance drilled by the drill bit for modifying said signal by an amount proportional to variations in the distance drilled caused by variations in said at least one variable operating characteristic to produce a signal proportional to the distance drilled per unit number of revolutions of the drill bit under uniform conditions and means for exhibiting an indication of said modified signal.

13. A system for logging a well during a rotary drilling operation wherein variable operating characteristics affecting drilling rate include the weight of the drill bit and the pressure on the circulating drilling fluid comprising means for producing an electrical signal which normally would be proportional to the actual distance drilled per unit number of revolutions of the drill bit, means responsive to variations in at least one variable operating characteristic which affects the distance drilled by the drill bit for modifying said electrical signal by an amount proportional to variations in the distance drilled caused by variations in said at least one variable operating characteristic to produce a signal proportional to the distance drilled per unit number of revolutions of the drill bit under uniform conditions, and means for exhibiting an indication of said modified electrical signal.

14. A system for logging a well during a rotary drilling operation comprising means for producing a signal which normally would be proportional to the drilling rate expressed in terms of the actual distance drilled per unit number of revolutions of the drill bit, and means responsive to variations in the weight on the drill bit for modifying said signal by an amount proportional to variations in said drilling rate caused by said variations in the weight on the drill bit to produce a signal proportional to the distance drilled per unit number of revolutions of the drill bit under uniform conditions.

15. A system for logging a well during a rotary drilling operation with a drilling fluid comprising means for producing a signal which normally would be proportional to the drilling rate expressed in terms of the actual distance drilled per unit number of revolutions of the drill bit, and means responsive to variations in the pressure of the drilling fluid for modifying said signal by an amount proportional to variations in said drilling rate caused by variations in the pressure of the drilling fluid to produce a signal proportional to the distance drilled per unit number of revolutions of the drill bit under uniform conditions.

16. A system for logging a well during a rotary drilling operation comprising means for producing an electrical signal which normally would be directly proportional to the actual distance drilled per unit number of revolutions of the drill bit, means responsive to variations in the weight on the drill bit for converting said variations into variations in the distance drilled caused by said variations in the weight on the drill bit, and means for modifying the electrical signal by an amount proportional to said variations in the distance drilled to produce a signal proportional to the distance drilled per unit number of revolutions of the drill bit under uniform conditions.

17. A system for logging a well during a rotary drilling operation comprising a first means for producing a signal which normally would be proportional to the actual distance drilled per unit number of revolutions of the drill bit, a second means responsive to variations in the weight on the drill bit, a third means actuated by said second means for determining variations in the distance drilled caused by variations in the weight on the drill bit, a fourth means responsive to pressure of circulating drilling fluid for modifying the signal produced by said first means in accordance with the variations in the distance drilled determined by said third means and a fifth means for exhibiting an indication of said modified signal.

18. Apparatus for logging a well during a rotary drilling operation wherein variable operating characteristics affecting drilling rate include the weight of the drill bit and the pressure on the circulating drilling fluid comprising means for recording an electrical signal on a recording medium, means associated with the drill string-supporting mechanism for moving said recording medium in a manner proportional to the movement of said drill string-supporting mechanism, means actuated by said last-mentioned means and actuating said recording means for producing an electrical signal proportional to the penetration of said drill string per unit number of revolutions of said string, means for indicating variations in the rate of penetration of said drill string which are caused by variations of at least one operating characteristic, and means for modifying the electrical signal by an amount proportional to said variations in said rate of penetration of said drill string.

DANIEL SILVERMAN.
ROBERT W. STUART.

REFERENCES CITED

The following references are of record in the file of this patent:

UNITED STATES PATENTS

| Number | Name | Date |
|---|---|---|
| 2,322,478 | Scherbatskoy | June 22, 1943 |
| 2,357,051 | McLaine | Aug. 29, 1944 |
| 2,365,014 | Silverman et al. | Dec. 12, 1944 |